United States Patent
Chen et al.

(10) Patent No.: US 8,573,167 B2
(45) Date of Patent: Nov. 5, 2013

(54) CONTROL VALVE FOR A DEVICE FOR VARIABLY ADJUSTING THE CONTROL TIMES OF GAS-EXCHANGE VALVES OF AN INTERNAL COMBUSTION ENGINE

(75) Inventors: Xuewei Chen, Novi, MI (US); Chuck Chang, Lomita, CA (US); Roger Meyer, Brighton, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 13/139,040

(22) PCT Filed: Nov. 19, 2009

(86) PCT No.: PCT/EP2009/065495
§ 371 (c)(1),
(2), (4) Date: Nov. 23, 2011

(87) PCT Pub. No.: WO2010/066551
PCT Pub. Date: Jun. 17, 2010

(65) Prior Publication Data
US 2012/0055427 A1    Mar. 8, 2012

Related U.S. Application Data

(60) Provisional application No. 61/121,314, filed on Dec. 10, 2008.

(51) Int. Cl.
*F01L 9/02*    (2006.01)
(52) U.S. Cl.
USPC ............... 123/90.12; 123/90.13; 123/90.15; 137/522; 210/428

(58) Field of Classification Search
USPC .............. 123/90.12, 90.13, 90.15; 137/522; 210/428
See application file for complete search history.

(56) References Cited

U.S. PATENT DOCUMENTS

| 6,971,353 | B2 | 12/2005 | Heinze et al. |
| 7,367,356 | B2 * | 5/2008 | Berndorfer ............... 137/614.2 |
| 2006/0016495 | A1 | 1/2006 | Strauss et al. |
| 2007/0095315 | A1 | 5/2007 | Hoppe et al. |

FOREIGN PATENT DOCUMENTS

| DE | 103 46 443 A1 | 5/2005 |
| DE | 10 2005 028 757 A1 | 1/2007 |
| WO | 2006/127347 A | 11/2006 |

* cited by examiner

*Primary Examiner* — Ching Chang
(74) *Attorney, Agent, or Firm* — Lucas & Mercanti, LLP

(57) ABSTRACT

A control valve for a device to variably adjust control times of gas-exchange valves of an internal combustion engine. The control device has a valve housing and a control piston. The valve housing has an axial cavity with a dividing element arranged in the cavity that separates the cavity into two partial spaces and hydraulically seals the spaces from one another. The dividing element is produced separately from the valve housing and is positionally fixedly fastened in the cavity of the valve housing. The first partial space holds the control piston, and a supply connection is formed in the region of the first partial space. The second partial space has at least one first opening via which pressure medium can be supplied to the second partial space by a pressure medium pump, and at least one second opening by which the second partial space communicates with the supply connection.

10 Claims, 3 Drawing Sheets

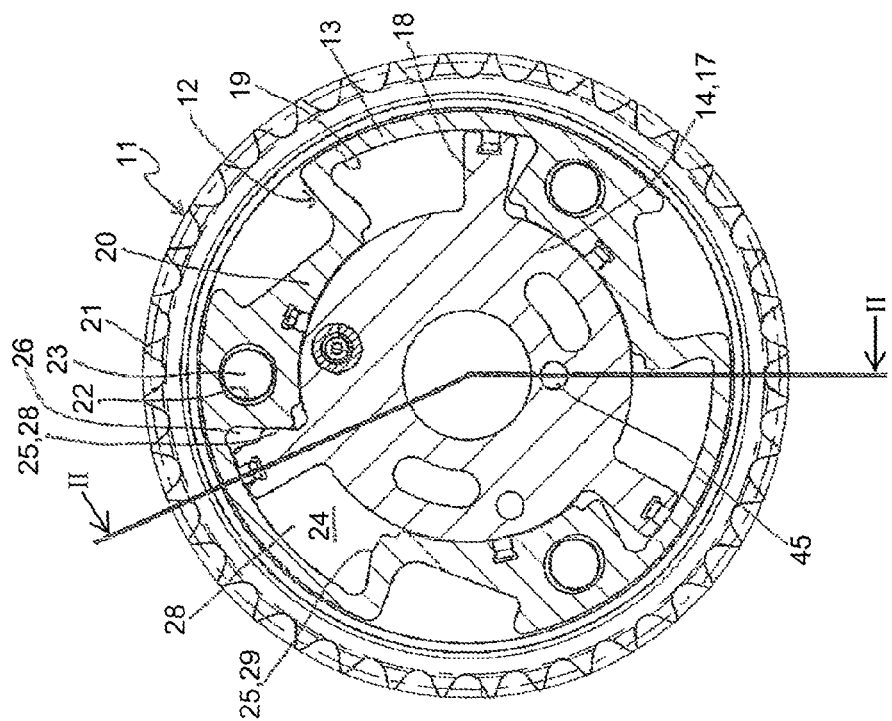
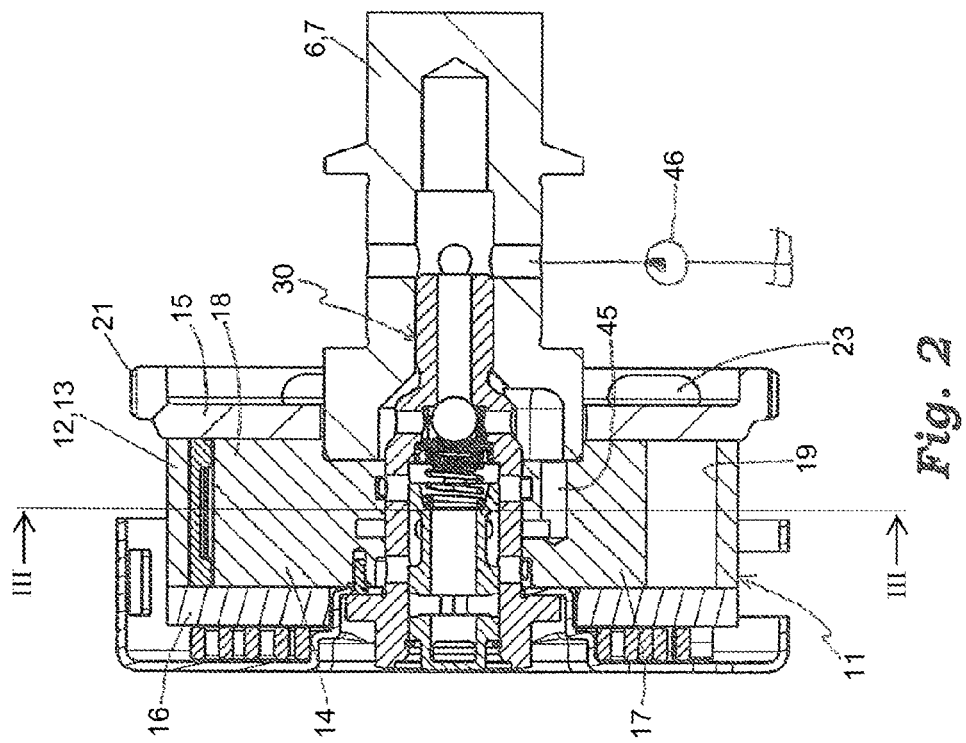
Fig. 3
Fig. 2

CONTROL VALVE FOR A DEVICE FOR VARIABLY ADJUSTING THE CONTROL TIMES OF GAS-EXCHANGE VALVES OF AN INTERNAL COMBUSTION ENGINE

This application is a 371 of PCT/EP2009/065495 filed Nov. 19, 2009, which in turn claims the priority of U.S. Provisional Patent Application No. 61/121,314 filed Dec. 10, 2008, the priority of both applications is hereby claimed and both applications are incorporated by reference herein.

FIELD OF THE INVENTION

The invention relates to a control valve for a device for variably adjusting the control times of gas-exchange valves of an internal combustion engine.

BACKGROUND OF THE INVENTION

In modern internal combustion engines, use is made of devices for variably adjusting the control times of gas-exchange valves in order to be able to variably adjust the phase relationship between the crankshaft and the camshaft in a defined angle range between a maximum early position and a maximum late position. For this purpose, the device is integrated into a drivetrain which serves to transmit torque from the crankshaft to the camshaft. Said drivetrain may for example be realized as a belt drive, chain drive or gearwheel drive. The devices have a hydraulic actuating drive composed of at least two pressure chambers which act counter to one another. The pressure medium flows from and to the pressure chambers are controlled by means of a hydraulic control valve. Control valves of said type have a hydraulic section, via which the pressure medium is conducted, and an actuating drive, which controls the hydraulic section. Here, so-called plug-in valves are known which are arranged in a receptacle of the cylinder head or of the cylinder head cover. The actuating drive of said control valves is fixedly connected to the hydraulic section. Also known are so-called central valves whose hydraulic section is held in the device and rotates with the latter. The actuating drive is fixedly connected to the cylinder head or to the cylinder head cover, with the positioning movement being transmitted to the hydraulic section by means of a plunger rod.

A control valve of said type and a device are known for example from U.S. Pat. No. 6,971,353 A1. The device comprises a drive output element which is arranged so as to be rotatable with respect to a drive input element, with the drive input element being drive-connected to the crankshaft, and the drive output element being rotationally fixedly connected to the camshaft. The device is delimited in the axial direction by means of in each case one side cover, with one of the side covers supporting a drive input wheel. The drive output element, the drive input element and the two side covers delimit a plurality of pressure spaces, with each of the pressure spaces being divided by means of a vane into two pressure chambers which act counter to one another. By supplying pressure medium to and discharging medium from the pressure chambers, the vanes within the pressure spaces are moved, thereby bringing about a targeted rotation of the drive output element with respect to the drive input element and therefore of the camshaft with respect to the crankshaft.

The device is rotationally fixedly connected to the camshaft by means of a central screw which simultaneously serves as a control valve. The control valve has a valve housing into which are formed two central and axially running cavities which are axially offset with respect to one another. Arranged in one of the cavities is a control piston which can be moved axially in the cavity, counter to the force of a spring, by means of an electromagnetic actuating unit. The second cavity communicates with the interior, which is acted on with pressure medium, of the camshaft. Pressure medium can be supplied to a supply connection, which is arranged in the region of the first cavity, of the control valve via the second cavity and via radial bores axial bores, which open out into said cavity, within the drive output element. Pressure medium is supplied to the first or second pressure chambers, and pressure medium is discharged from the other pressure chambers, as a function of the position of the control piston within the first cavity.

A disadvantage of said embodiment is the complex structure of the control valve. In particular, the formation of two cavities into the valve housing, which are axially offset with respect to one another and are hydraulically separated from one another by material of the valve housing, requires complex and expensive machining steps. Furthermore, dirt particles present in the interior of the camshaft can penetrate into the control valve and impair its functional capability. Furthermore, pressure peaks which are generated in the device on account of the alternating torque acting on the camshaft can propagate into the pressure medium circuit and cause damage to connected loads or the pressure medium pump.

SUMMARY OF THE INVENTION

The object on which the invention is based is that of creating a control valve for a device for variably adjusting the control times of gas-exchange valves of an internal combustion engine, wherein the functionality of said control valve should be increased and the production costs of said control valve should be reduced.

The object is achieved according to the invention by means of a control valve for a device for variably adjusting the control times of gas-exchange valves of an internal combustion engine, having a valve housing and a control piston. Here, the valve housing has an axial cavity, for example a bore, with a dividing element being arranged in the cavity, which dividing element divides said cavity into two partial spaces and hydraulically seals said partial spaces off from one another. The dividing element is produced separately from the valve housing and is positionally fixedly fastened, for example in a force-fitting, cohesive or form-fitting manner, in the cavity of said valve housing. Here, on account of the positionally fixed fastening, the dividing element cannot perform any relative movement with respect to the valve housing. As a result of the dividing element being formed separately and being positioned retroactively, it is possible to dispense with a second cavity. Furthermore, it is possible for further components, for example a filter or a non-return valve, to be positioned in the second partial space and fixed by the subsequent insertion of the dividing element. The production costs and the complexity of the control valve are thereby reduced, wherein the functionality of said control valve can be increased. The first partial space holds the control piston, and a supply connection, for example a radial opening, is formed in the region of the first partial space. The second partial space has at least one first opening. Said first opening may for example be formed as a radial opening which is formed in the region of a pressure medium rotary transmitter and via which the interior of the camshaft can be acted on with pressure medium. Alternatively, the first opening may for example be formed on an axial side surface of the valve housing. In this way, the pressure medium rotary transmitter can be arranged at any desired position of the camshaft, thereby providing an increased degree of freedom in the design of the device. Furthermore, the axial installation space requirement of the control valve is reduced. Pressure medium can be supplied to the first partial space via the first opening by a pressure medium pump, for example via the interior of the camshaft. The second partial space has at least one second opening, by means of which the second partial space communicates with the supply connection.

In one refinement of the invention, it may be provided that a thread and a contact surface for fastening the device to a shaft are formed on the valve housing. The control valve therefore simultaneously acts as a central screw, by means of which the device is fastened to the shaft which is to be adjusted, for example the camshaft, the crankshaft or the intermediate shaft. No separate fastening elements are therefore required.

A non-return valve having a spring element and having a closing body, for example a ball, a cylindrical component or a component with a conical section, may be arranged in the second partial space. Here, it may be provided that the cavity is of stepped design, with the second partial space having a step at a boundary region between a region of relatively large diameter and a region of relatively small diameter, and with the step serving as a valve seat for the closing body. No additional component is required to realize the valve seat. The axial installation space requirement and the costs of the device are therefore reduced. It may also be provided that the spring element is supported on the dividing element.

Furthermore, an annular filter may be arranged in the second partial space, with it being possible for the non-return valve to be arranged within the annular filter. Pressure peaks which are generated in the device are thereby prevented from propagating into the lubricant circuit, and dirt particles are thereby prevented from penetrating into the control valve. The arrangement of the non-return valve within the annular filter counteracts an increase in the axial installation space requirement as a result of the two functional components. Furthermore, the annular filter may serve as a guide element for the closing body, as a result of which an otherwise traditional guide cage may be dispensed with.

In one refinement of the invention, a spring may be provided which is supported at one side on the dividing element and at the other side on the control piston. The dividing element therefore functions as a support element both for the spring, which acts on the control piston with a force, and also for the spring element of the non-return valve. An additional component is not required.

In one physical embodiment of the invention, it is provided that the cavity runs along the entire axial extent of the valve housing and the first opening is formed on an axial side surface of the valve housing.

In one advantageous refinement of the invention, it may be provided that the dividing element is formed in one piece with a frame of an annular filter or with a guide cage of a non-return valve. The number of separate components of the control valve can thereby be reduced, and the assembly expenditure therefore lowered.

BRIEF DESCRIPTION OF THE DRAWINGS

Further features of the invention can be gathered from the following description and from the drawings, which illustrate exemplary embodiments of the invention in simplified form, and in which:

FIG. 2 shows a longitudinal section through the device for varying the control times of gas-exchange valves of an internal combustion engine, in which device is arranged a control valve according to the invention, along the line II-II from FIG. 3, FIG. 3 shows a cross section through the device from FIG. 2, without the control valve, along the line III-III.

DETAILED DESCRIPTION OF THE INVENTION

Figure 1:
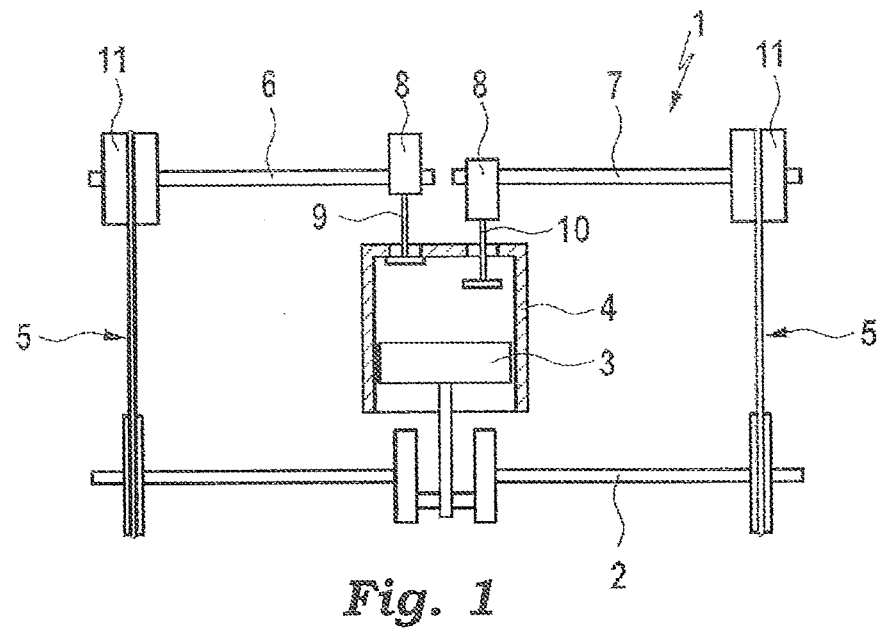
FIG. 1 shows an internal combustion engine in highly schematic form.

FIG. 1 shows a sketch of an internal combustion engine 1, with a piston 3 which is seated on a crankshaft 2 being shown in a cylinder 4. In the illustrated embodiment, the crankshaft 2 is connected by means of in each case one traction mechanism drive 5 to an inlet camshaft 6 and outlet camshaft 7, wherein a first and a second device 11 can serve to provide a relative rotation between the crankshaft 2 and the camshafts 6, 7. Cams 8 of the camshafts 6, 7 actuate one or more inlet gas-exchange valves 9 and one or more outlet gas-exchange valves 10 respectively. It may likewise be provided that only one of the camshafts 6, 7 is fitted with a device 11, or that only one camshaft 6, 7 is provided, which is provided with a device 11.

FIGS. 2 and 3 show an embodiment of a device 11 in longitudinal or cross section. The device 11 has a drive input element 12 and a drive output element 14. The drive input element 12 has a housing 13 and two side covers 15, 16 which are arranged on the axial side surfaces of the housing 13. The drive output element 14 is designed in the form of an impeller and has a substantially cylindrical hub element 17, from the outer cylindrical lateral surface of which three vanes 18 extend outward in the radial direction in the illustrated embodiment.

Three projections 20 extend radially inward from an outer peripheral wall 19 of the housing 13. In the illustrated embodiment, the projections 20 and the vanes 18 are formed in one piece with the peripheral wall 19 and with the hub element 17 respectively. The drive input element 12 is arranged, by means of radially inner peripheral walls of the projections 20, relative to the drive output element 14 so as to be rotatable with respect to the latter.

A sprocket 21 is arranged on an outer lateral surface of the first side cover 15, via which sprocket 21 torque can be transmitted, by means of a chain drive (not illustrated), from the crankshaft 2 to the drive input element 12. The drive output element 14 is connected to a camshaft 6, 7 by means of a control valve 30 which is embodied as a central screw. For this purpose, the control valve 30 is provided with a thread 31 and a contact surface 32. The control valve 30 extends through a central bore of the drive output element 14 and is screwed by means of the thread 31 to the camshaft 6, 7. At the same time, the contact surface 32 bears against that side surface of the device 11 which faces away from the thread 31, such that said device 11 is fastened in a frictionally engaging manner to the camshaft 6, 7. Alternatively, the device 11 may also be fastened to the crankshaft 2 or to an intermediate shaft.

In each case one of the side covers 15, 16 is arranged on, and rotationally fixedly connected to, one of the axial side surfaces of the housing 13. For this purpose, an axial opening 22 is provided in each projection 20. Furthermore, in each case three openings are provided in the side covers 15, 16, which openings are arranged so as to be aligned with the axial openings 22. In each case one fastening element 23 (in the illustrated embodiment, a screw) extends through an opening of the second side cover 16, an axial opening 22 and an opening of the first side cover 15. Here, a threaded section of the screw 23 engages into a threaded section which is formed in the opening of the second side cover 16.

Within the device 11, a pressure space 24 is formed between in each case two projections 20 which are adjacent in the peripheral direction. Each of the pressure spaces 24 is delimited in the peripheral direction by opposite, substantially radially running delimiting walls 25 of adjacent projections 20, in the axial direction by the side covers 15, 16, radially inward by the hub element 17, and radially outward by the peripheral wall 19. A vane 18 projects into each of the pressure spaces 24, with the vanes 18 being designed so as to bear both against the side covers 15, 16 and also against the peripheral wall 19. Each vane 18 therefore divides the respective pressure space 24 into two pressure chambers 26, 27 which act counter to one another.

The drive output element 14 is arranged so as to be rotatable relative to the drive input element 12 in a defined angle range. The angle range is limited in one rotational direction of the drive output element 14 in that the vanes 18 come to bear against in each case one corresponding delimiting wall 25 (early stop 28) of the pressure spaces 24. Similarly, the angle range is limited in the other rotational direction in that the vanes 18 come to bear against the other delimiting walls 25 of the pressure chambers 24, which other delimiting walls 25 serve as a late stop 29.

The phase position of the drive input element 12 with respect to the drive output element 14 (and therefore the phase position of the camshaft 6, 7 with respect to the crankshaft 2) can be varied by means of one group of pressure chambers 26, 27 being pressurized and the other group being relieved of pressure. The phase position can be held constant by means of both groups of pressure chambers 26, 27 being pressurized.

Figure 4:
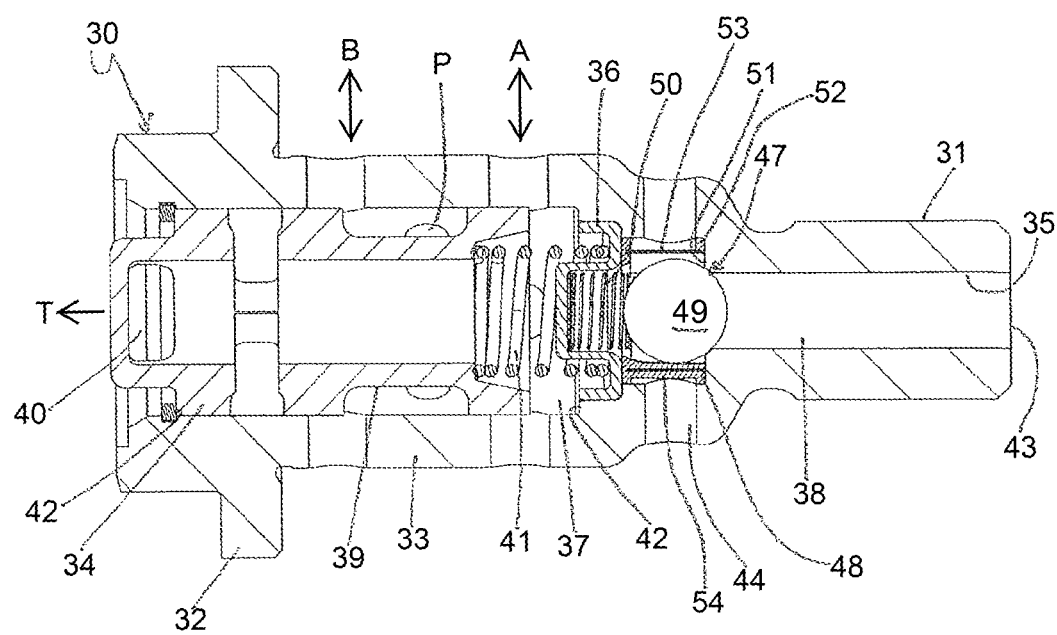
FIG. 4 shows a longitudinal section through a first embodiment of a control valve according to the invention.

The control valve 30 is illustrated on a larger scale in FIG. 4. Said control valve 30 has a valve housing 33 and a control piston 34. The valve housing 33 is of substantially hollow cylindrical design. A cavity 35 runs within the valve housing 33 in the axial direction, which cavity 35 is formed, as a through bore, so as to be open at the two axial side surfaces of the valve housing 33. The cavity 35 can therefore be produced in one working step. The formation of a second cavity, as described in the prior art, is dispensed with. The production expenditure is thereby reduced considerably. A dividing element 36 is arranged in the cavity 35, which dividing element 36 divides the cavity 35 into a first and a second partial space 37, 38. The dividing element 36 is formed separately from the valve housing 33 and is positionally fixedly connected thereto. In the illustrated embodiment, the dividing element 36 is formed as a sheet-metal component and is connected in a force-fitting manner to a wall of the cavity 35. Form-fitting or cohesive connections are likewise conceivable. The dividing element 36 is designed so as to prevent a direct pressure medium flow between the partial spaces 37, 38, that is to say the dividing element 36 hydraulically divides the partial spaces 37, 38 from one another.

A supply connection P and two working connections A, B, which communicate with in each case one of the groups of pressure chambers 26, 27, are formed on the valve housing 33 in the region of the first partial space 37. In the illustrated embodiment, said hydraulic connections A, B, P are formed as radial openings of the valve housing 33, which radial openings communicate with the first partial space 37. Also provided is a discharge connection T. In the illustrated embodiment, said discharge connection T is formed as an axial opening of the valve housing 33.

The control piston 34 is arranged in an axially movable manner within the first partial space 37. The control piston 34 is likewise of substantially hollow cylindrical design, with the outer lateral surface of said control piston 34 being matched to the cavity 35 in the region of the first partial space 37. An annular groove 39 is formed on the outer lateral surface of the control piston 34, which annular groove 39 communicates with the supply connection P in all positions of the control piston 34 relative to the valve housing 33. Furthermore, radial openings 40 are provided on that side of the control piston 34 which faces away from the second partial space 38.

The control piston 34 can be pushed in the axial direction, and held in any desired position between two stops 42, counter to the force of a spring 41 by means of an actuating unit (not illustrated). The spring 41 is supported at one end on the control piston 34 and at the other end on the dividing element 36.

The second partial space 38 has one first and a plurality of second openings 43, 44. The first opening 43 is formed on that side of the valve housing 33 which faces away from the first partial space 37, as a result of which the second partial space 38 communicates with the interior of the hollow camshaft 6, 7. The second openings 44 are formed as radial openings of the valve housing 33, and communicate with the supply connection P via axial bores 45 in the drive output element 14.

During the operation of the internal combustion engine 1, a pressure medium pump 46 delivers pressure medium, generally engine oil, at high pressure into the interior of the camshaft 6, 7. From there, said pressure medium passes via the first opening 43, the second partial space 38, the second openings 44 and the axial bores 45 to the inflow connection P and therefore into the first annular groove 39. The pressure medium passes to the first working connection A (and therefore to the first pressure chambers 26) or to the second working connection B (and therefore to the second pressure chambers 27) as a function of the position of the control piston 34 relative to the valve housing 33. At the same time, pressure medium from the other pressure chambers 26, 27 passes, unpressurized, via the respective working connection A, B into the interior of the control piston 34, and is discharged out of the control valve 30 via the radial openings 40 and the outflow connection T. Here, the dividing element 36 divides the unpressurized pressure medium in the first partial space 37, which is discharged from the respective pressure chambers 26, 27, from the pressurized pressure medium which is present in the second partial space 38.

In the second partial space 38, a non-return valve 47 and an annular filter 48 are arranged in the flow direction of the pressure medium between the first opening 43 and the second openings 44. The non-return valve 47 comprises a closing body 49 and a spring element 50. The spring element 50 is supported at one side on the dividing element 36 and engages at the other side on the closing body 49 which is embodied as a ball. In addition to the embodiment of the closing body 49 as a ball, cylindrical closing bodies or closing bodies with a conical section are also conceivable. The spring element 50 acts on the closing body 49 with a force which is directed counter to the flow direction of the pressure medium. The cavity 35 is formed as a stepped bore with a step 51 between a region of relatively large diameter and a region of relatively small diameter, with the step 51 being arranged in the second partial space 38. The step 51 serves as a valve seat for the closing body 49 of the non-return valve 47. Therefore, no additional component is required which serves as a valve seat, as a result of which the control valve 30 can be designed to be shorter in the axial direction. In the event of pressure peaks occurring within the device 11, the closing body 49 is forced into the valve seat (the step 51) such that the pressure peaks cannot propagate into the lubricant circuit of the internal combustion engine 1. Damage to the pressure medium pump 46 or to other connected loads is thereby counteracted.

Figure 5:
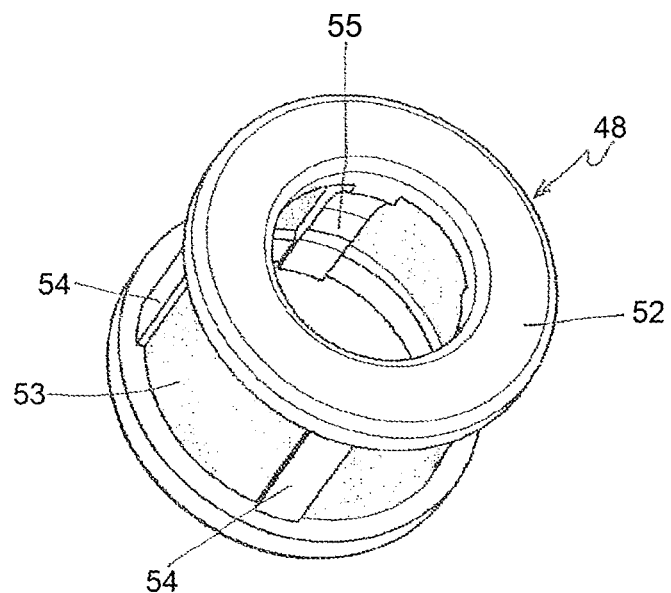
FIG. 5 shows a perspective view of the annular filter which is arranged in the control valve.

FIG. 5 shows the annular filter 48. Said annular filter 48 is composed of a frame 52, for example composed of a suitable plastic, which has two annular sections which are connected to one another by means of four struts 54. Provided between the struts 54 are passage openings in which a cylindrical filter fabric 53 is arranged. The filter fabric 53 is held in the frame 52. This may be provided for example by virtue of the filter fabric 53 being placed into the injection molding tool during the production of the frame 52. The annular filter 48 is arranged in the region of the second openings 44. The pressure medium which enters into the second partial space 38 must therefore pass through the filter fabric 53 in order to pass to the second openings 44. Dirt particles are thereby prevented from entering into the first partial space 37 and from causing the control piston 34 to become jammed within the valve housing 33. The annular filter 48 bears against the step 51, as a result of which the axial position of said annular filter 48 is defined.

The closing body 49 is arranged within the annular filter 48, with the axial struts 54 of the annular filter 48 forming a guide cage for the closing body 49, for this purpose, guide surfaces 55 are formed on the struts 54, which guide surfaces 55 guide the closing body 49 during its axial movement. The radial position of the closing body 49 is defined by virtue of three or more struts 54 (four struts 54 in the illustrated embodiment) being provided which are distributed over the periphery of the annular sections of the frame 52.

As a result of the arrangement of the closing body 49 within the annular filter 48, the axial installation space requirement of the control valve 30 can be further reduced. As a result of the guide surfaces 55 being formed on the frame 52 of the annular filter 48, it is possible to dispense with a separate guide cage, as a result of which the number of components of the control valve 30 is reduced and its production costs are thereby lowered.

Figure 6:
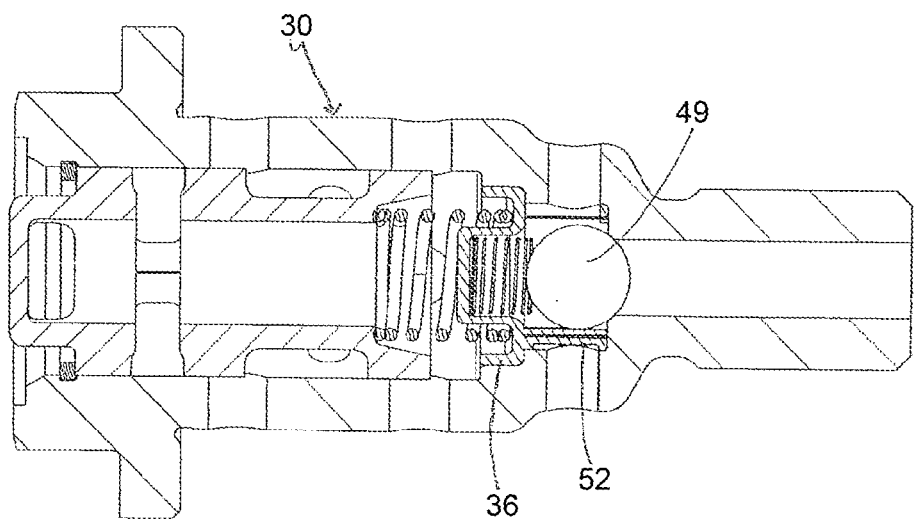
FIG. 6 shows a longitudinal section through a second embodiment of a control valve according to the invention.

FIG. 6 shows a further embodiment of a control valve 30 according to the invention. In said embodiment, the frame 52 and therefore the guide cage of the closing body 49 are formed in one piece with the dividing element 36. This may take place by virtue of the combined component being produced from plastic by means of an injection molding process.

Other embodiments are also conceivable in addition to the illustrated embodiments of a control valve 30 in which the control valve 30 is embodied as a central screw and the fastening of the device 11 to the camshaft 6, 7 therefore takes place by means of the control valve 30. For example, the fastening of the camshaft 6, 7 to the device could be realized in some other way, for example in a cohesive, form-fitting or force-fitting manner, and the control valve 30 could perform solely the function of conducting pressure medium flows to and from the device. In such a case, it is possible to dispense with the thread 31 and the contact surface 32. It is likewise conceivable for the invention to be realized in a plug-in valve.

LIST OF REFERENCE SYMBOLS

1 Internal Combustion Engine
2 Crankshaft
3 Piston
4 Cylinder
5 Traction Mechanism Drive
6 Inlet Camshaft
7 Outlet Camshaft
8 Cam
9 Inlet Gas-Exchange Valve
10 Outlet Gas-Exchange Valve
11 Device
12 Drive Input Element
13 Housing
14 Drive Output Element
15 Side Cover
16 Side Cover
17 Hub Element
18 Vane
19 Peripheral Wall
20 Projection
21 Sprocket
22 Axial Opening
23 Fastening Element
24 Pressure Space
25 Delimiting Wall
26 First Pressure Chamber
27 Second Pressure Chamber
28 Early Stop
29 Late Stop
30 Control Valve
31 Thread
32 Contact Surface
33 Valve Housing
34 Control Piston
35 Cavity
36 Dividing Element
37 First Partial Space
38 Second Partial Space
39 Annular Groove
40 Radial Openings
41 Spring
42 Stop
43 First Opening
44 Second Opening
45 Axial Bore
46 Pressure Medium Pump
47 Non-Return Valve
48 Annular Filter
49 Closing Body
50 Spring Element
51 Step
52 Frame
53 Filter Fabric
54 Strut
A First Working Connection
B Second Working Connection
P Supply Connection
T Discharge Connection

The invention claimed is:

1. A control valve for a device variably adjusting control times of gas-exchange valves of an internal combustion engine, comprising:
a valve housing having an axial cavity;
a control piston arranged within the valve housing;
a dividing element arranged in the cavity separating the cavity into two partial spaces, a first partial space and a second partial space, and hydraulically sealing the partial spaces from one another, the dividing element being produced separately from the valve housing and being positionally fixedly fastened in the cavity of the valve housing, the first partial space holding the control piston, a supply connection being formed in a region of the first partial space, and the second partial space having at least one first opening via which a pressure medium can be supplied to the second partial space by a pressure medium pump and at least one second opening, by means of which the second partial space communicates with the supply connection;

an annular filter arranged in the second partial space; and a non-return valve arranged radially within the annular filter.

2. The control valve as claimed in claim 1, wherein the valve housing has a thread and a contact surface formed on the valve housing for fastening the device to a shaft.

3. The control valve as claimed in claim 1, wherein the non-return valve has a closing body and a spring element arranged in the second partial space.

4. The control valve as claimed in claim 3, wherein the second partial space has a cavity, which is stepped such that a step acting as a valve seat is formed at a boundary region between a region of a relatively large diameter and a region of a relatively small diameter.

5. The control valve as claimed in claim 3, wherein the spring element is supported on the dividing element.

6. The control valve as claimed in claim 1, further comprising a spring supported at one side on the dividing element and at the other side on the control piston.

7. The control valve as claimed in claim 1, wherein the cavity extends an entire axial extent of the valve housing and the first opening is formed on an axial side surface of the valve housing.

8. The control valve as claimed in claim 1, wherein the annular filter has a frame arranged within the second partial space and the non-return valve has a guide cage arranged within the second partial space such that the dividing element is formed in one piece with the frame of the annular filter or the guide cage of the non-return valve.

9. The control valve as claimed in claim 1, wherein the annular filter has a frame and the non-return valve has a closing body, the frame of the annular filter forming a guide cage for the closing body.

10. The control valve as claimed in claim 9, wherein the dividing element is formed in one piece with the frame.

* * * * *

UNITED STATES PATENT AND TRADEMARK OFFICE
CERTIFICATE OF CORRECTION

PATENT NO. : 8,573,167 B2
APPLICATION NO. : 13/139040
DATED : November 5, 2013
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 231 days.

Signed and Sealed this

Twenty-second Day of September, 2015

Michelle K. Lee
*Director of the United States Patent and Trademark Office*